US008589888B2

(12) United States Patent　　(10) Patent No.: US 8,589,888 B2
Cui et al.　　(45) Date of Patent: Nov. 19, 2013

(54) DEMAND-DRIVEN ANALYSIS OF POINTERS FOR SOFTWARE PROGRAM ANALYSIS AND DEBUGGING

(75) Inventors: Weidong Cui, Redmond, WA (US); Marcus Peinado, Bellevue, WA (US); Zhilei Xu, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 13/220,651

(22) Filed: Aug. 29, 2011

(65) Prior Publication Data

US 2013/0055207 A1　　Feb. 28, 2013

(51) Int. Cl.
*G06F 9/44* (2006.01)
*G06F 9/45* (2006.01)

(52) U.S. Cl.
USPC .......................................... 717/125; 717/144

(58) Field of Classification Search
USPC .................................................. 717/125, 144
See application file for complete search history.

(56) References Cited

U.S. PATENT DOCUMENTS

| 5,555,412 | A * | 9/1996 | Besaw et al. | 717/144 |
|---|---|---|---|---|
| 5,896,537 | A * | 4/1999 | Landi et al. | 717/132 |
| 6,072,950 | A | 6/2000 | Steensgaard | |
| 7,089,537 | B2 | 8/2006 | Das et al. | |
| 8,141,049 | B2 * | 3/2012 | Kahlon | 717/126 |
| 8,185,881 | B2 * | 5/2012 | Brand et al. | 717/132 |
| 2003/0074652 | A1 | 4/2003 | Harrison et al. | |
| 2004/0243980 | A1 | 12/2004 | Das | |
| 2008/0229286 | A1 * | 9/2008 | Kahlon | 717/126 |
| 2010/0070955 | A1 * | 3/2010 | Kahlon | 717/141 |

OTHER PUBLICATIONS

Saha, et al., "Incremental and Demand-driven Points to Analysis Using Logic Programming", Proceedings of the 7th ACM SIGPLAN international conference on Principles and practice of declarative programming, Jul. 11-13, 2005, pp. 12.

Mine, Antoine., "Field-Sensitive Value Analysis of Embedded C Programs with Union Types and Pointer Arithmetics", Proceedings of the 2006 ACM SIGPLAN/SIGBED conference on Language, compilers, and tool support for embedded systems, Jun. 14-16, 2006, pp. 10.

Prabhu, et al., "Field Flow Sensitive Pointer and Escape Analysis for Java Using Heap Array SSA", Proceedings of the 15th international symposium on Static Analysis, 2008, pp. 1-17.

Yan, et al., "Demand-Driven Context-Sensitive Alias Analysis for Java", Proceedings of the 20th International Symposium on Software Testing and Analysis, Publisher—ACM, Jul. 17-21, 2011, pp. 20.

(Continued)

*Primary Examiner* — Philip Wang
(74) *Attorney, Agent, or Firm* — Lyon & Harr, LLP; Mark A. Watson

(57) ABSTRACT

A "Demand-Driven Pointer Analyzer" (DDPA) provides a "demand-driven" field-sensitive pointer analysis process. This process rapidly and accurately identifies alias sets for selected pointers in software modules or programs of any size, including large-scale C/C++ programs such as a complete operating system (OS). The DDPA formulates the pointer analysis task as a Context-Free Language (CFL) reachability problem that operates using a Program Expression Graph (PEG) automatically constructed from the program code. The PEG provides a node and edge-based graph representation of all expressions and assignments in the program and allows the DDPA to rapidly identify aliases for pointers in the program by traversing the graph as a CFL reachability problem to determine pointer alias sets. In various embodiments, the DDPA is also context-sensitive.

20 Claims, 6 Drawing Sheets

(56) References Cited

OTHER PUBLICATIONS

Martena, et al., "Alias Analysis by means of a Model Checker", Proceedings of 10th International Conference on Compiler Construction Held as Part of the Joint European Conferences on Theory and Practice of Software, Publisher-Springer, Apr. 2-6, 2001, pp. 1-14.
Whaley, et al., "An Efficient Inclusion-Based Points-To Analysis for Strictly-Typed Languages", Proceedings of the 9th International Symposium on Static Analysis, 2002, pp. 16.
Albert, et al., "Field-Sensitive Value Analysis by Field-Insensitive Analysis", Proceedings of the 2nd World Congress on Formal Methods, 2009, pp. 16.
Weiser, Mark., "Program Slicing", Proceedings of the 5th international conference on Software engineering, 1981, pp. 11.
Andersen, Lars Ole., "Program Analysis and Specialization for the C Programming Language", Technical Report, May 1994, pp. 311.
Avots, et al., "Improving Software Security with a C Pointer Analysis", Proceedings of the 27th international conference on Software engineering, May 15-21, 2005, pp. 10.
Baliga, et al., "Automatic Inference and Enforcement of Kernel Data Structure Invariants", Proceedings of the 24th Annual Computer Security Applications Conference, Dec. 8-12, 2008, pp. 77-86.
Bhansali, et al., "Framework for Instruction-level Tracing and Analysis of Program Executions", Proceedings of the 2nd international conference on Virtual execution environments, Jun. 14-16, 2006, pp. 154-163.
Carbone, et al., "Mapping Kernel Objects to Enable Systematic Integrity Checking", Proceedings of the 16th ACM conference on Computer and communications security, Nov. 9-13, 2009, pp. 11.
Cozzie, et al., "Digging for Data Structures", Proceedings of the 8th USENIX conference on Operating systems design and implementation, 2008, pp. 1-12.
Das, Manuvir., "Unification-based Pointer Analysis with Directional Assignments", Proceedings of the ACM SIGPLAN 2000 conference on Programming language design and implementation, Jun. 18-21, 2000, pp. 1-12.
Glerum, et al., "Debugging in the (Very) Large: Ten Years of Implementation and Experience", Proceedings of the ACM SIGOPS 22nd symposium on Operating systems principles, Oct. 11-14, 2009, pp. 1-17.
Hardekopf, et al., "The Ant and the Grasshopper: Fast and Accurate Pointer Analysis for Millions of Lines of Code", Proceedings of the ACM SIGPLAN Conference on Programming Language Design and Implementation, Jun. 10-13, 2007, pp. 290-299.
Hardekopf, et al., "Semi-sparse Flow-sensitive Pointer Analysis", Proceedings of the 36th annual ACM SIGPLAN-SIGACT symposium on Principles of programming languages, Jan. 18-24, 2009, pp. 13.
Heintze, et al., "Ultra-fast Aliasing Analysis using CLA—A Million Lines of C Code in a Second", Proceedings of the ACM SIGPLAN 2001 conference on Programming language design and implementation, Jun. 20-22, 2001, pp. 254-263.
Hind, et al., "Pointer Analysis: Haven't we Solved this Problem Yet?", Proceedings of the 2001 ACM SIGPLAN-SIGSOFT workshop on Program analysis for software tools and engineering, Jun. 18-19, 2001, pp. 8.
Hofmann, et al., "Ensuring Operating System Kernel Integrity with OSck", Proceedings of the sixteenth international conference on Architectural support for programming languages and operating systems, Mar. 5-11, 2011, pp. 12.
Kahlon, Vineet., "Bootstrapping: A Technique for Scalable Flow and Context-sensitive Pointer Alias Analysis", Proceedings of the 2008 ACM SIGPLAN conference on Programming language design and implementation, Jun. 7-13, 2008, pp. 10.
Lattner, et al., "Making Context-sensitive Points-to Analysis with Heap Cloning Practical for the Real World", Proceedings of the ACM SIGPLAN conference on Programming language design and implementation, Jun. 11-13, 2007, pp. 12.
Lee, et al., "TIE: Principled Reverse Engineering of Types in Binary Programs", Proceedings of the 18th Annual Network and Distributed System Security Symposium, 2011, pp. 18.
Lin, et al., "Automatic Reverse Engineering of Data Structures from Binary Execution", Proceedings of the 17th Annual Network and Distributed System Security Symposium, 2010, pp. 18.
"Debug Interface Access SDK", Retrieved Date: Apr. 21, 2011, pp. 1.
"Download and Install Debugging Tools for Windows", Retrieved Date: Apr. 21, 2011, pp. 1.
"Npaged__Lookaside__List", Retrieved Date: Apr. 21, 2011, pp. 2.
"PREfast for Drivers", Retrieved Date: Apr. 21, 2011, pp. 2.
"About the Windows Driver Kit (WDK)", Retrieved Date: Apr. 21, 2011, pp. 1.
"Windows HPC Server 2008 R2", Retrieved Date: Apr. 21, 2011, pp. 3.
"Virtualization with Hyper-V", Retrieved Date: Apr. 21, 2011, pp. 1.
"Who's Using the Pool?", May 25, 2007, pp. 2.
Petroni, et al., "Automated Detection of Persistent Kernel Control-flow Attacks", In Proceedings of the ACM Conference on Computer and Communications Security, Oct. 29-Nov. 2, 2007, pp. 13.
Pearce, et al., "Efficient Field-sensitive Pointer Analysis for C", Proceedings of the 5th ACM SIGPLAN-SIGSOFT workshop on Program analysis for software tools and engineering, Jun. 7-8, 2004, pp. 6.
Polishchuk, et al., "Dynamic Heap Type Inference for Program Understanding and Debugging", Proceedings of the 34th annual ACM SIGPLAN-SIGACT symposium on Principles of programming languages, Jan. 17-19, 2007, pp. 8.
Reps, Thomas., "Program Analysis via Graph Reachability", International Logic Programming Symposium, Oct. 12-17, 1997, pp. 19.
Sridharan, et al., "Refinement-based Context-sensitive Points-to Analysis for Java", Technical Report No. UCB/EECS-2006-31, Mar. 31, 2006, pp. 17.
Sridharan, et al., "Demand-driven Points-to Analysis for Java", Proceedings of the 20th annual ACM SIGPLAN conference on Object-oriented programming, systems, languages, and applications, Oct. 16-20, 2005, pp. 18.
Steensgaard, Bjarne., "Points-to Analysis in Almost Linear Time", Proceedings of the 23rd ACM SIGPLAN-SIGACT symposium on Principles of programming languages, Jan. 21-24, 1996, pp. 10.
Wilson, et al., "Efficient Context-sensitive Pointer Analysis for C Programs", In Proceedings of the ACM SIGPLAN, conference on Programming language design and implementation, Jun. 18-21, 1995, pp. 1-12.
Zheng, et al., "Demand-driven Alias Analysis for C", Proceedings of the 35th annual ACM SIGPLAN-SIGACT symposium on Principles of programming languages, Jan. 7-12, 2008, pp. 12.

\* cited by examiner

DEMAND-DRIVEN ANALYSIS OF POINTERS FOR SOFTWARE PROGRAM ANALYSIS AND DEBUGGING

BACKGROUND

1. Technical Field

A "Demand-Driven Pointer Analyzer" (DDPA) provides a "demand-driven" field-sensitive pointer analysis process that rapidly and accurately identifies alias sets for selected pointers in a software program or other computer source code.

2. Background Art

Type information is typically not readily available for dynamic data of system programs developed in native code. The lack of type information makes it extremely difficult to perform certain tasks on a program's memory such as checking kernel integrity and debugging crash dumps.

There are a variety of conventional techniques that attempt to locate and type dynamic data in a memory snapshot while using information relating to the dynamic data for memory analysis and debugging. Unfortunately, such conventional techniques are generally not adequate for robustly and quickly analyzing memory snapshots of large-scale programs such as modern operating system (OS) kernels with high data coverage.

For example one well-known process, referred to as the "Kernel Object Pinpointer" (KOP), types dynamic data in a kernel memory snapshot with very high coverage, but is lacking in terms of robustness and performance. In fact, using a typical computing device, KOP may take several days to identify candidate types for generic pointers in a large-scale program such as an OS. Further, KOP is relatively slow in typing dynamic data in a memory snapshot. Further, the utility of KOP is fairly limited in that it was originally designed to analyze memory crash dumps for a particular OS, and was not capable of operating on real-world crash dumps that contain information relating to third party drivers. Such issues limit the utility of processes such as KOP.

Other processes have introduced the concept of transforming program analysis problems to graph-reachability problems. One such process applied this idea to demand-driven points-to analysis for Java. In general, this process presented a refinement-based algorithm for demand-driven context-sensitive analysis for Java. However, given that Java's memory model is much simpler than languages such as C/C++, there is no real "memory alias" (where two variables reside in the same location) and any heap access goes through a field.

A related process provides a demand-driven alias analysis algorithm for C. This process makes use of an exploration process so that the language of the grammar is "accepted" by a hierarchical state machine. In general, this process traverses a program expression graph (PEG) and appears to terminate as soon as the query can be answered, thus the query is of type alias? (p,q) and returns true/false. In other words, rather than return a complete alias set for particular pointers, this process merely answers the question of whether two particular pointers (i.e., (p,q)) are aliases of each other. Unfortunately, this process is neither field nor context sensitive.

Other conventional tools perform dynamic heap type inference by using type information embedded in debug symbols in an attempt to assign a compatible program-defined type to each heap block by checking type constraints. If a block cannot be typed, such tools use it as a hint for heap corruptions and type safety violations. Unfortunately, such tools do not scale to large programs such as typical OS kernels.

Several other schemes have attempted to solve the problem of identifying dynamic data and their types without access to source code and type definitions. Some such schemes use Bayesian unsupervised learning to infer data structures and their instances. Other such schemes operate by recognizing dynamic data and their types when they are passed as parameters to known APIs at runtime. Yet other such schemes operate by reverse engineering data type abstractions from binary programs based on type reconstruction theory and is not limited to a single execution trace. Such reverse engineering tools are more effective for analyzing small to medium scale programs than for large-scale programs like OS kernels. Unfortunately, high data coverage cannot typically be achieved without access to source code when analyzing kernel memory snapshots.

Finally, kernel integrity checking has been studied in a large body of work. Various integrity checking schemes operate by leveraging type definitions and manual annotations to traverse memory and inspect function pointers. Unfortunately, without dealing with generic pointers, such schemes suffer from relatively sparse coverage. Related schemes operate to discover OS kernel rootkits by detecting modifications to kernel data. Instead of memory traversal, one such scheme identifies kernel data and their types by taking advantage of the slab allocation scheme used in Linux. It provides per-type allocations and enables direct identification of kernel data types. Unfortunately, such schemes are not applicable to the more general class of operating systems that do not use slab allocation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Demand-Driven Pointer Analyzer" or "DDPA", as described herein, provides a "demand-driven" field-sensitive pointer analysis process that rapidly and accurately identifies alias sets for selected pointers in software modules or programs (i.e., source code, binary modules, etc.) of any size.

The DDPA formulates the pointer analysis task as a Context-Free Language (CFL) reachability problem that operates using a Program Expression Graph (PEG) that is automatically constructed from the program code. The PEG provides a node and edge-based graph representation of all expressions and assignments in the program and allows the DDPA to rapidly identify aliases for selected pointers in the program. This formulation allows the DDPA to analyze a given pointer by traversing only the related part of a program rather than the entire program.

More specifically, as discussed in further detail herein, the processes enabled by the DDPA identify alias sets for selected pointers from the source code of a given program/software. In the PEG formulation used by the DDPA, the nodes are program expressions, and the edges are either an "Assignment Edge" or a "Dereference Edge", as discussed in further detail herein. Therefore, given an interesting expression p selected by the user (via a user interface or the like) or by any desired type of automated process, the demand-driven pointer analysis process for expression p searches for the set of expressions q such that pVq, referred to as the "value alias set" of p. The computation of the V relation by the DDPA is formulated as a CFL reachability problem over the PEG.

In particular, a relation R (such as value alias) over the nodes of the PEG is formulated as a CFL-reachability problem by constructing a grammar G such that a node pair (a,b) is in R if and only if there is a path from a to b such that the sequence of labels along the path belongs to the language L(G) (i.e., the language generated by the grammar (G). A "pushdown automaton" having a variety of pre-defined states is used to efficiently "accept" the language generated by the alias grammar of the CFL problem. In other words, a sequence of labels belongs to the CFL if and only if it is accepted by the pushdown automaton (i.e., the automaton ends at certain states after traversing the sequence). However, the DDPA uses a query of type alias_set(p) and returns p's alias set, which is fundamentally harder than a conventional alias? (p,q) formulation that merely answers the question of whether two pointers are aliases.

In addition, in various embodiments, the DDPA is both field-sensitive and context-sensitive. In fact, the DDPA provides rules for handling field sensitivity in C/C++ type programs that allow field-sensitivity to be tracked separately from a grammar for assignments and dereferences as part of solving the CFL reachability problem. Uses of the DDPA include, but are not limited to, near real-time debugging of applications and identification and detection of function pointers manipulated by kernel rootkits or other malware to point to corrupted data.

In view of the above summary, it is clear that the DDPA described herein provides a "demand-driven" field-sensitive pointer analysis process that rapidly and accurately identifies alias sets for selected pointers in software modules or programs of any size. In addition to the just described benefits, other advantages of the DDPA will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
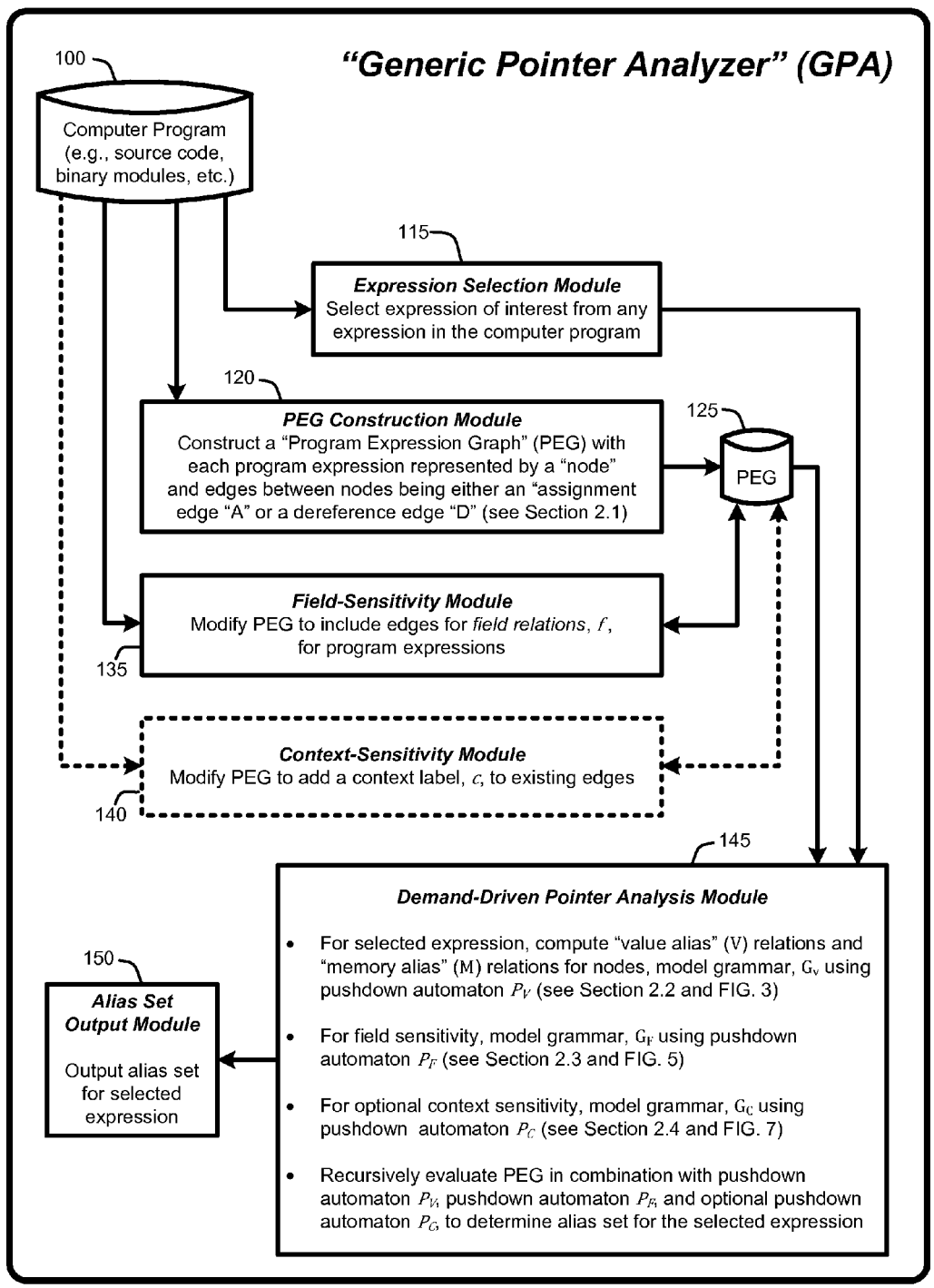
FIG. 1 provides an exemplary architectural flow diagram that illustrates program modules for that provide a "demand-driven" pointer analysis process that determines alias sets for the selected pointers in a software program using a "Demand-Driven Pointer Analyzer," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Demand-Driven Pointer Analyzer" or "DDPA", as described herein, provides a "demand-driven" field-sensitive pointer analysis process that rapidly and accurately identifies alias sets for selected pointers in software modules or programs (i.e., source code, binary modules, etc.) of any size. The pointer alias sets can then be used for a variety of purposes, such as debugging or optimizing the software, identifying types of dynamic data in a memory snapshot captured during program execution, etc. Note that memory snapshots may include "crash dumps" and the like that may be automatically collected upon OS or application errors or crashes.

The DDPA formulates the pointer analysis task as a Context-Free Language (CFL) reachability problem that operates using a Program Expression Graph (PEG) that is automatically constructed from the program code. The PEG provides a node and edge-based graph representation of all expressions and assignments in the program and allows the DDPA to rapidly identify aliases for selected pointers in the program. Alias identification is performed in an on-demand basis such that the analysis is performed to identify a complete alias set of a selected pointer (i.e., on-demand) that is also referred to herein as an "interesting expression" or "expression of interest" rather than all pointers. This formulation allows the DDPA to analyze a given pointer by traversing only the related part of a program rather than the entire program.

More specifically, as discussed in further detail herein, the processes enabled by the DDPA identify alias sets for selected pointers from the source code of a given program/software. In the PEG formulation used by the DDPA, the nodes are program expressions, and the edges are either an "Assignment Edge" or a "Dereference Edge", as discussed in further detail herein. Therefore, given an interesting expression p selected by the user (via a user interface or the like) or by any desired type of automated process, the demand-driven pointer analysis process for expression p searches for the set of expressions a such that pVq, referred to as the "value alias set" of p. The computation of the V relation by the DDPA is formulated as a CFL reachability problem over the PEG.

In particular, a relation R (such as value alias) over the nodes of the PEG is formulated as a CFL-reachability problem by constructing a grammar G such that a node pair (a,b) is in R if and only if there is a path from a to b such that the sequence of labels along the path belongs to the language L(G) (i.e., the language generated by the grammar G). A "pushdown automaton" having a variety of pre-defined states is used to efficiently "accept" the language generated by the alias grammar of the CFL problem. In other words, a sequence of labels belongs to the CFL if and only if it is accepted by the pushdown automaton (i.e., the automaton ends at certain states after traversing the sequence). However, the DDPA uses a query of type alias_set(p) and returns p's alias set, which is fundamentally harder than a conventional alias? (p,q) formulation that merely answers the question of whether two pointers are aliases. Note that an example of this concept is discussed below in Section 2.1 with respect to FIG. 2.

Many system programs, particularly operating system kernels, are developed in native code like C or C++. With such programs, type information is typically not available for dynamic data (i.e., data dynamically allocated on a heap or pool). The lack of type information makes it extremely difficult to perform certain tasks on a program's memory. For instance, to detect kernel-mode malware, the integrity of the complete kernel code and data is checked. However, without the type information of dynamic kernel data, it is difficult to check their integrity (e.g., detecting manipulated function pointers). Another example is the triage and debugging of crashes caused by memory corruptions, where humans often manually analyze the crash dump to determine the higher-level meaning of some of the raw bits in the crash dump. Fortunately, the capability of the DDPA to identify alias sets for selected pointers facilitates such analyses.

As discussed in further detail in Section 2, the DDPA identifies alias sets for selected pointers from the source code of a given program/software. The DDPA provides these capabilities for a wide variety of applications and operating systems, including, but not limited to the kernel and device drivers in the Windows® OS. In fact, these processes not only perform precise and efficient pointer analysis on a large program like the Windows® kernel, but also identify the single correct candidate type for most pointers.

More specifically, as noted above, and as discussed in further detail in Section 2, the demand-driven analysis performed by the DDPA formulates the points-to analysis problem as a CFL reachability problem. This formulation allows the DDPA to analyze a given pointer by traversing only the related part of a program. Further, in contrast to conventional techniques that perform field-insensitive and context-insensitive may-alias analysis of only two pointers, in various embodiments, the analysis provided by the DDPA is field-sensitive and context-sensitive, and computes a complete "points-to" set (i.e., the alias set) of a single pointer at once.

1.1 System Overview:

As noted above, the "Demand-Driven Pointer Analyzer," provides a "demand-driven" field-sensitive pointer analysis process that rapidly and accurately identifies alias sets for selected pointers in software modules or programs (i.e., source code, binary modules, etc.) of any size, and that, in various embodiments, is also context-sensitive. In various embodiments, the DDPA is provided as a standalone application or program for use in analyzing other source code, programs, or applications (e.g., source code, binary modules, etc.). However, in various embodiments, the DDPA is implemented as a "plug-in" or integrated component of a compiler program. In either case, the DDPA converts the source code, program, or application to be analyzed into a PEG (see Section 2.1) then performs the demand-driven pointer analysis for selected pointers based on that PEG. As discussed in detail below, this demand-driven pointer analysis generally traverses the PEG to determine which edges should be followed between nodes (based on the grammar of the CFL discussed in Section 2.2) to determine alias sets for selected pointers in a manner that is optionally field-sensitive (see Section 2.3) and context-sensitive (see Section 2.4).

The processes summarized above are illustrated by the general system diagram of FIG. 1. In particular, the system diagram of FIG. 1 illustrates the interrelationships between program modules for implementing various embodiments of the DDPA, as described herein. Furthermore, while the system diagram of FIG. 1 illustrates a high-level view of various embodiments of the DDPA, FIG. 1 is not intended to provide an exhaustive or complete illustration of every possible embodiment of the DDPA as described throughout this document.

In addition, it should be noted that any boxes and interconnections between boxes that may be represented by broken or dashed lines in FIG. 1 represent alternate embodiments of the DDPA described herein, and that any or all of these alternate embodiments, as described below, may be used in combination with other alternate embodiments that are described throughout this document.

In general, as illustrated by FIG. 1, the processes enabled by the DDPA begin operation by using an expression selection module 115 to select an expression (e.g., variables, pointers, etc.) of interest from the expressions used by the computer program 100. In other words, a particular expression that is to be evaluated is selected either via user input (via a user interface or the like) or via any desired automated process for the purpose of determining an alias set for that expression, as discussed in further detail below.

In general, the expression of interest is provided to a demand-driven pointer analysis module 145 in combination with a program expression graph (PEG) 125 and corresponding pushdown automatons (see Sections 2.2, 2.3 and 2.4 for a discussion of these automatons).

Construction of the PEG 125 is based on the computer program 100. More specifically a PEG construction module 120 receives the computer program 100 and constructs the PEG 125 such that each program expression is represented by a "node" in the PEG and edges between nodes are either an "assignment edge "A" or a dereference edge "D", as discussed in Section 2.1.

In addition, the PEG 125 is modified by a field-sensitivity module 135 to include additional edges for field relations, f, for expressions of the computer program 100. In a related optional embodiment, the PEG 125 is further modified (following the modification to include field relations) to add context labels derived from the computer program 100 to existing edges of the PEG.

Figure 3:
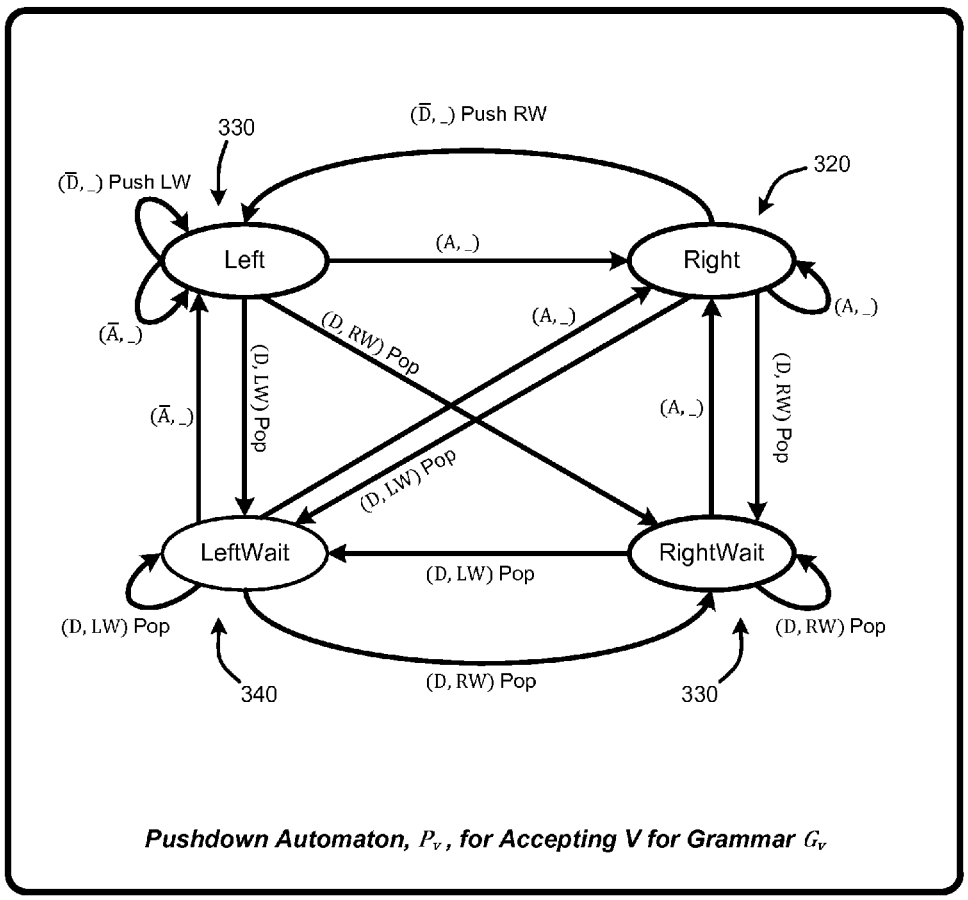
FIG. 3 provides an exemplary "pushdown automaton" for modeling a context free grammar used for computing value aliases of pointers, as described herein FIG. 4 provides an illustration of the relations between struct, field, and base pointer for a simple exemplary C-type program and a corresponding PEG representation of the exemplary C-type program, as described herein.

As noted above, the PEG 125, modified as summarized above, is provided to the demand-driven pointer analysis module 145. The demand-driven pointer analysis module 145 then computes additional relations for a "value alias", V, and a "memory alias", M between the nodes and models a grammar, $G_V$ for these additional relations using a "pushdown automaton" $P_V$, as discussed in further detail in Section 2.2 and as illustrated by FIG. 3 and the corresponding discussion. Further, the demand-driven pointer analysis module 145 also models another grammar, $G_F$, that includes the edges for field sensitivity using a "field-sensitive pushdown automaton" $P_F$, as discussed in further detail in Section 2.3 and with respect to FIG. 5. In addition, the demand-driven pointer analysis module 145 optionally models yet another grammar, $G_C$, that includes the optional context labels using a "context-sensitive pushdown automaton" $P_C$, as discussed in further detail in Section 2.4 and with respect to FIG. 7.

Finally, the demand-driven pointer analysis module 145 recursively evaluates the PEG 125 relative to the selected expression using the pushdown automaton $P_V$, the pushdown automaton $P_F$ and the optional pushdown automaton $P_C$ to identify the alias set from the computer program 100 for the selected expression. This alias set is then provided to an alias set output module 150 that outputs the alias set for the selected expression for use in a wide variety of tasks, including, but not limited to, program debugging operations, rootkit detection or evaluation, etc.

2.0 Operational Details of the Demand-Driven Pointer Analyzer:

The above-described program modules are employed for implementing various embodiments of the Demand-Driven Pointer Analyzer (DDPA). As summarized above, the DDPA provides a "demand-driven" field-sensitive pointer analysis process that rapidly and accurately identifies alias sets for selected pointers in software modules or programs (i.e., source code, binary modules, etc.) of any size and that, in various embodiments, is also context-sensitive.

The following paragraphs describe the demand-driven pointer analysis provided by the DDPA for generating type-related information for pointers. In general, as discussed in detail below, given a particular pointer p selected for analysis, the pointer analysis processes provided by the DDPA search for all pointers q that may point to the same location as p. This is useful because when p is a generic pointer, q's type is a candidate type for p. Further, the pointer analysis is demand-driven because, in contrast to traditional pointer analyses, the alias information for all the variables in a program is not needed. Instead, the DDPA computes the alias sets of selected pointers in a process that, in various embodiments, is field-sensitive, context-sensitive and inclusion-based. The DDPA also achieves partial flow-sensitivity by conservatively converting the input program to a "Static Single Assignment" (SSA) form. In addition, the DDPA also handles indirect calls.

In the following paragraphs, a basic procedure for implementing the DDPA is first described without considering field-sensitivity and context-sensitivity followed by a discussion of how these optional considerations are added to the general processes provided by the DDPA. In particular, the following sections provide a detailed discussion of the operation of various embodiments of the DDPA, and of exemplary methods for implementing the program modules described in Section 1 with respect to FIG. 1. In particular, the following sections provide examples and operational details of various embodiments of the DDPA, including: Program Expression Graphs (PEG); Context-Free Language (CFL) reachability solution for processing the PEG; optional field sensitivity; and optional context sensitivity.

2.1 Program Expression Graph (PEG):

The DDPA operates by applying a CFL-reachability solution (see Section 2.2) to a Program Expression Graph (PEG) which is a graph representation of all expressions and assignments in a C-like program. Note that program expression graphs are known to those skilled in the art, and will not be described in detail herein. Note also that has the following discussion uses the following definitions and associated symbols:

a) A C-type program expression is represented using the symbol "*" for dereference operations;
b) A C-type program expression is represented using the symbol "&" for take-address operations;
c) A C-type program expression is represented using the symbol "→" for field operations;
d) In a PEG, the nodes are program expressions, and the edges are directional edges (shown using arrows to indicate direction) that are one of two kinds:

1) Assignment Edge (A): For each assignment $e_1=e_2$, there is an A-edge from $e_2$ to $e_1$;
2) Dereference Edge (D): For each dereference *e, there is a D-edge from e to *e, and for each address &e, there is a D-edge from &e to e.

Figure 2:
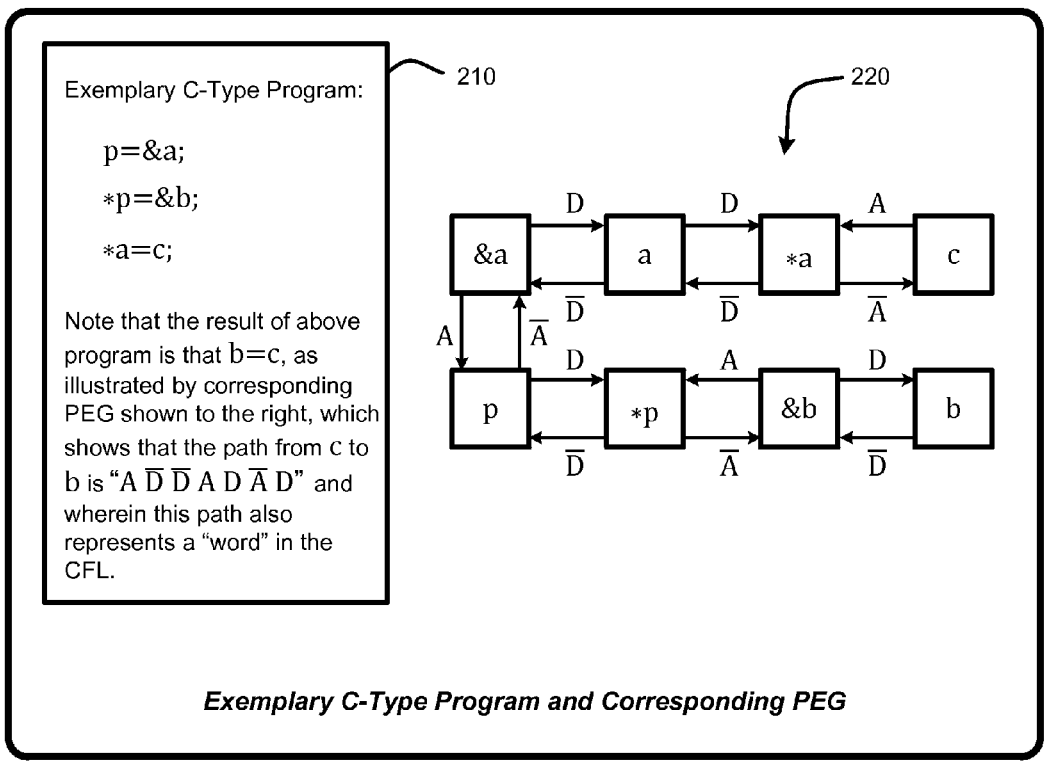
FIG. 2 provides an example of a simple exemplary C-type program and corresponding program expression graph (PEG), as described herein.

For each A and D edge in the PEG, there is also a corresponding inverse edge in the opposite direction, denoted by $\overline{A}$ and $\overline{T}$. The edges can also be treated as relations between the corresponding nodes, such that relations $\overline{A}$ and $\overline{D}$ are the inverse relations of A and D. FIG. 2 shows a sample C program (210) and it's PEG (220). More specifically, the source C program (210) consists of the pointer assignments shown on the left, with the corresponding PEG (220) on the right. The nodes in the graph represent all program expressions and sub-expressions. For example, in FIG. 2, it can be seen that these expressions and sub-expressions include: &a, a, *a, c, p, *p, &b, and b. As such, it should be understood that the expressions and sub-expressions, as well as the edges between those expressions and sub-expressions for a particular PEG will depend upon the program or application code being processed by the DDPA.

Note that for readability, node expressions are shown in C form in FIG. 2, not in canonical form. Each edge in the PEG is denoted as either an "assignment edge" using the symbol A (or its inverse using $\overline{A}$) or a "dereference edge" using the symbol D (or its inverse using $\overline{D}$) with the direction of each such edge shown by the corresponding arrow direction. Therefore, considering the exemplary C-type program of FIG. 2, it can be seen that there is a path from c to b (since b=c in this example) represented by sequence of edges "A$\overline{D}\overline{D}$AD $\overline{A}$D". Conversely, it can be seen that the path from b to c is simply "$\overline{D}$A$\overline{D}$A$\overline{D}\overline{D}\overline{A}$". Further, it should also be understood that both of these paths ("A$\overline{D}\overline{D}$A$\overline{D}$AD" and "$\overline{D}$A$\overline{D}$A$\overline{D}\overline{D}\overline{A}$") represent separate "words" of the grammar of the context free language (CFL), as discussed in further detail in Section 2.2.

2.2 CFL-Reachability Solution:

The DDPA achieves that above-summarized demand-driven pointer analysis for determining alias sets for the selected pointers by, in part, defining additional relations between expressions (nodes) of the PEG beyond the traditional A and D PEG edges and their inverses, as noted above. In particular, these additional relations between expressions (nodes) of the PEG are specifically defined as follows:

a) Value Alias (V): If a and b may evaluate to the same value, then a and b are "value aliases", represented as aVb.
b) Memory Alias (M): If the addresses of a and b denote the same memory location, then a and b are "memory aliases", represented as aMb.

Consequently, in view of these additional relations, given an interesting expression p (i.e., some expression that the user wants to evaluate with the DDPA), the demand-driven pointer analysis searches for a set of expressions a such that pVq, referred to as the value alias set of p. The computation of the V relation is formulated as a CFL-reachability problem over the PEG. Specifically, a relation R over the nodes of the PEG can be formulated as a CFL-reachability problem by constructing a grammar G such that a node pair (a,b) has the relation R if and only if there is a path from a to b such that the sequence of labels (i.e., the resulting "word") along the path belongs to the language L(G). A formal definition of the context-free grammar $G_V$ for value and memory alias relations is provided below, where the symbol "?" indicates that the particular label or label sequence before it may or may not appear, and the symbol "*" indicates that the particular label or label sequence may not appear or appear an arbitrary number of times:

a) Value Alias V::=M|(M?$\overline{A}$)*V(AM?)*
b) Memory Alias M::=($\overline{D}$VD)?

In view of the relations defined above for value and memory aliases (V and M, respectively), it can be seen that the grammar $G_V$ has "non-terminals" V and M, and "terminals" A, $\overline{A}$, D, and $\overline{D}$. As noted above, the exemplary PEG of FIG. 2 contains a path from b to c with label sequence or word "$\overline{D}$A$\overline{D}$ADD$\overline{A}$", and a path from c to b with label sequence or word "A$\overline{D}$$\overline{D}$AD$\overline{A}$D", each of which can be produced by the V non-terminal in $G_V$. Consequently, it can be seen that the above-described grammar successfully deducts that b and c are value aliases (i.e., since b=c) in the example of FIG. 2.

The intuition behind each of the above described relations can be further understood in view of the following considerations abd examples:

a) M::=$\overline{D}$VD, Given *p$\overline{D}$pVqD*q, then because p and q are value aliases, it follows that *p and *q are memory aliases;
b) V::=M, Memory aliases are also value aliases (because each memory location holds only one value);
c) V::=VAM, Given aVbAcMd, then the value of a propagates to c (via assignment edge A since a and b are value aliases, V), with c residing in the same memory as d (via memory alias M). Therefore, a and d are value aliases. Similarly V::=M$\overline{A}$V.

Value and memory aliases are mutually recursive. Consequently, determining memory aliases requires determining value aliases for the addresses being dereferenced, and determining value aliases requires knowledge about memory aliases during value flows. This means that grammar $G_V$ cannot be reduced to a regular language. Therefore, the DDPA defines a construct referred to herein as a "pushdown automaton", $P_V$, to model $G_V$.

As illustrated by FIG. 3, discussed below, the pushdown automaton, $P_V$, is composed of five states (referred to for purposes of convenience as "Left", "Right", "LeftWait", "RightWait", and "Dead" which is simply the termination state), a stack storing two kinds of symbols (LW, RW), and a set of transition rules. Each transition rule is a 5-tuple, o $\xrightarrow{(l,t)s}$ n, where o is the old state, l is the label (A, $\overline{A}$, D, or $\overline{D}$) from the sequence consumed by the transition, t indicates the top of the stack ("LW", "RW", or "_" which means "don't care"), s is the action to the stack (Push LW or RW, Pop LW or RW, or NOP which means no operation), and n is the new state. The pushdown automaton $P_V$ is shown in FIG. 3. Its initial state is the state Left.

Given this pushdown automaton, any particular label sequence is said to be not acceptable given the grammar $G_V$ if the pushdown automaton reaches the state Dead. Conversely, for any particular label sequence, if that sequence ends in the same state when it began in the pushdown automaton, then that label (or word) is accepted by the pushdown automaton as a valid alias (i.e., the "word" formed by sequence of edge labels is valid based on the grammar $G_V$).

In the pushdown automaton $P_V$, the information about V (i.e., the value alias) is fully captured by the current state and stack. The states LeftWait and RightWait are used to indicate the expectation for edges $\overline{A}$ and A that connect M and V (see definitions for value and memory aliases, provided above). When the new label is $\overline{D}$, the pushdown automaton pushes either LW or RW to the stack; when it is D, the pushdown automaton pops the stack. This is used to match the pairs of $\overline{D}$ and D which come in a pair given that DV$\overline{D}$ (i.e., that D is a value alias of $\overline{D}$). Therefore, the stack depth represents the pointer levels. The states Left and Right are used to differentiate the expectation for $\overline{A}$ or A at a pointer level.

Further, because the stack can be indefinitely deep, depending on the source code being evaluated, the algorithm may not terminate. This issue is addressed in various embodiments of the DDPA by binding the stack depth by a predefined or user-adjustable limit such that the pushdown automaton transits to the state Dead when the stack is deeper than the limit. In other words, this optional limit ensures that the alias evaluation process will automatically terminate in the event that the stack is too deep. Though this can potentially introduce errors into the alias evaluation, by choosing a conservative limit (e.g., around 20 or so), the DDPA has been shown to handle most programs correctly.

2.3 Field Sensitivity:

Field-sensitivity is an advantgageous optional addition to the DDPA for performing pointer analysis since it allows the DDPA to distinguish a selected pointer field from other fields in the same data structure while a field-insensitive analysis treats all fields in a data structure as the structure itself.

Figure 4:
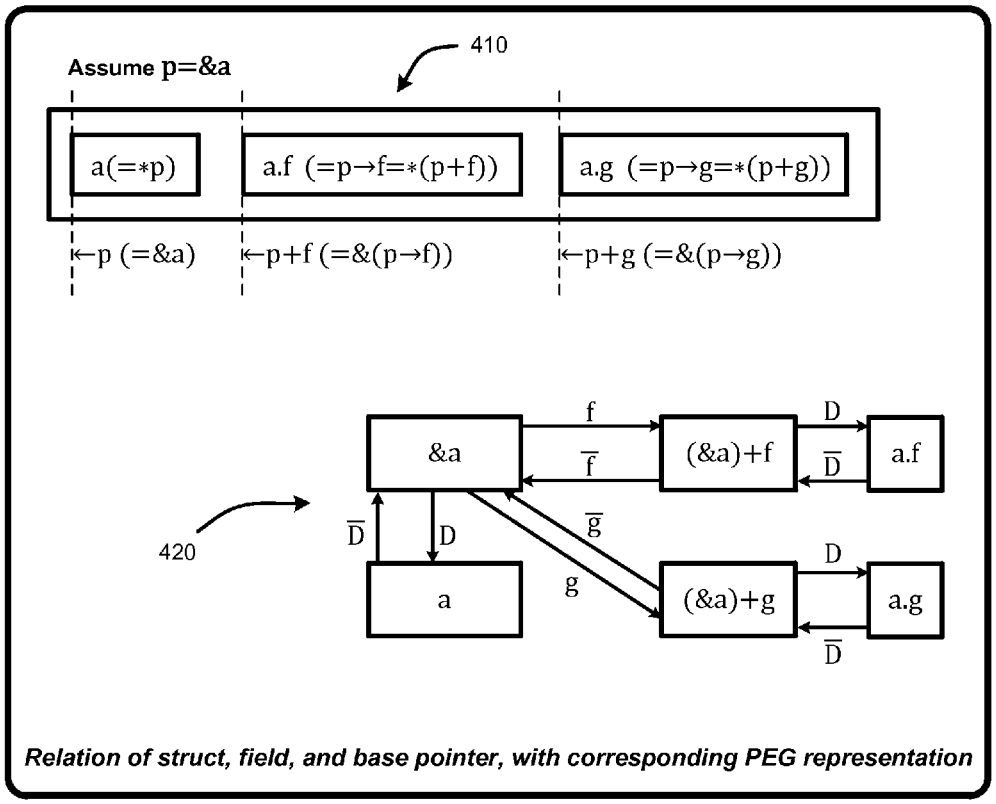

"Field" in C is a special kind of pointer arithmetic. In particular, given a base pointer p and a "field" f, then "&(p→f)" is the field pointer which points to a field inside the structure *p. The expression "p+f" is used herein to denote &(p→f), and p+f is in fact the result of offsetting p by a fixed number of bits determined by field f. Note that other constructs of this expression, such as illustrated by FIG. 4, e.g., "p→f(=*(p+f))" and "a.f(=(&a)→f=*(&a+f))", may be used as alternative ways to present such expressions in a manner that some people find easier to read or interpret.

Figure 5:
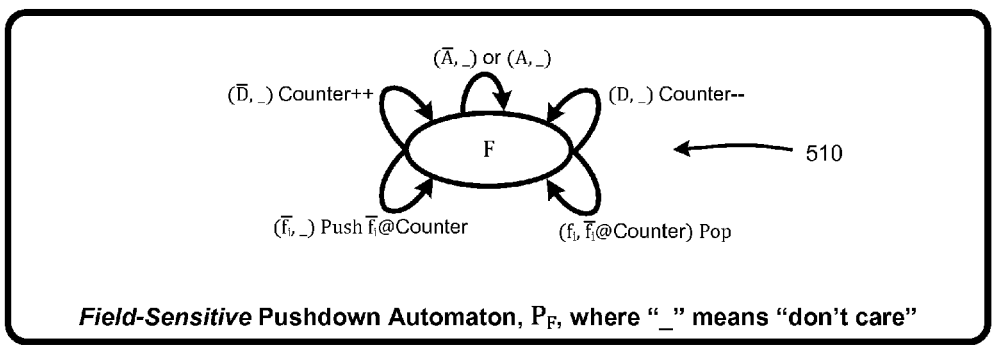
FIG. 5 provides an exemplary "field-sensitive pushdown automaton" for a modified PEG having additional edges denoting field relations, as described herein.

To support field-sensitivity in the pointer analysis performed by the DDPA, new edges are added to the PEG to represent the field relations. For every field descriptor, a field label $f_i$ is created. Then, for each base pointer p, if its field pointer "p+$f_i$" appears in the PEG, an edge labeled $f_i$ is added from p to p+$f_i$ and an inverse edge $\overline{f}_i$ in the opposite direction, as illustrated by FIG. 4. Then, adding "V::=$\overline{f}_i$V$f_i$" to the grammar, $G_V$, for field-sensitivity, the grammar is modified to become:

a) M::=($\overline{D}$VD)?
b) V::=M|(M?$\overline{A}$)*V(AM?)*|$\overline{f}_i$V$f_i$ However, the modified grammar shown above does not address the case of a struct assignment, which is another special feature in C. As is known to those skilled in the art, one structure can be assigned to another as if they were both simple variables, and the effect is the same as doing assignments between corresponding fields recursively (because each field can possibly be an embedded structure). Therefore, to correctly capture this semantic the DDPA adds yet another class of production rules to the grammar in order to construct a CFL grammar, $G_F$, for alias relations with respect to field sensitivity, as shown below:

a) M::=($\overline{D}$VD)?
b) V::=M|(M?$\overline{A}$)*V (AM?)*
   |$\overline{f}_i$V$f_i$
   |$\overline{D}$V$\overline{f}_i$VDV$\overline{D}$V$f_i$VD To deal with the new production rules of the above-described CFL grammar, $G_F$, instead of making significant changes to the pushdown automaton $P_V$ described above, a new field-sensitive pushdown automaton $P_F$ is defined to enable the DDPA to process field labels, while field labels are simply ignored in $P_V$ (i.e., the state and stack stay unchanged after field labels). The field-sensitive pushdown automaton $P_F$ has a state F and a termination state, a stack and a counter as shown in FIG. 5.

The stack stores tokens $f_i$@c, where $f_i$ is a field descriptor and c is an integer. It ignores A and $\overline{A}$ labels (i.e., adds a self-cycle), and deals with D, $\overline{D}$ and $f_i$, $\overline{f_i}$. In addition, "counter" counts the number of $\overline{D}$'s unmatched by D's, known as the current pointer level. Given a label $\overline{f_i}$, $P_F$ pushes the token $\overline{f_i}$@counter into the stack. Conversely, given a label $f_i$, $P_F$ pops the stack if both the field label and pointer levels are matched; otherwise, $P_F$ terminates. Note that the field-sensitive pushdown automaton $P_F$ starts with an empty stack and a zero counter. It accepts a sequence of labels (i.e., the "word" formed by sequence of edge labels is valid based on the grammar $G_F$) if the final stack is empty and the counter is zero.

In view of the above, it should be understood that a label sequence acceptable by the grammar $G_F$ (defined above) is acceptable by both the pushdown automaton $P_V$ and the field-sensitive pushdown automaton $P_F$. Therefore, the pointer analysis provided by the DDPA will not miss any value aliases with respect to field-sensitivity. In other words, the language acceptable by $P_V \wedge P_F$ is equivalent to the language specified by grammar $G_F$.

Figure 6:
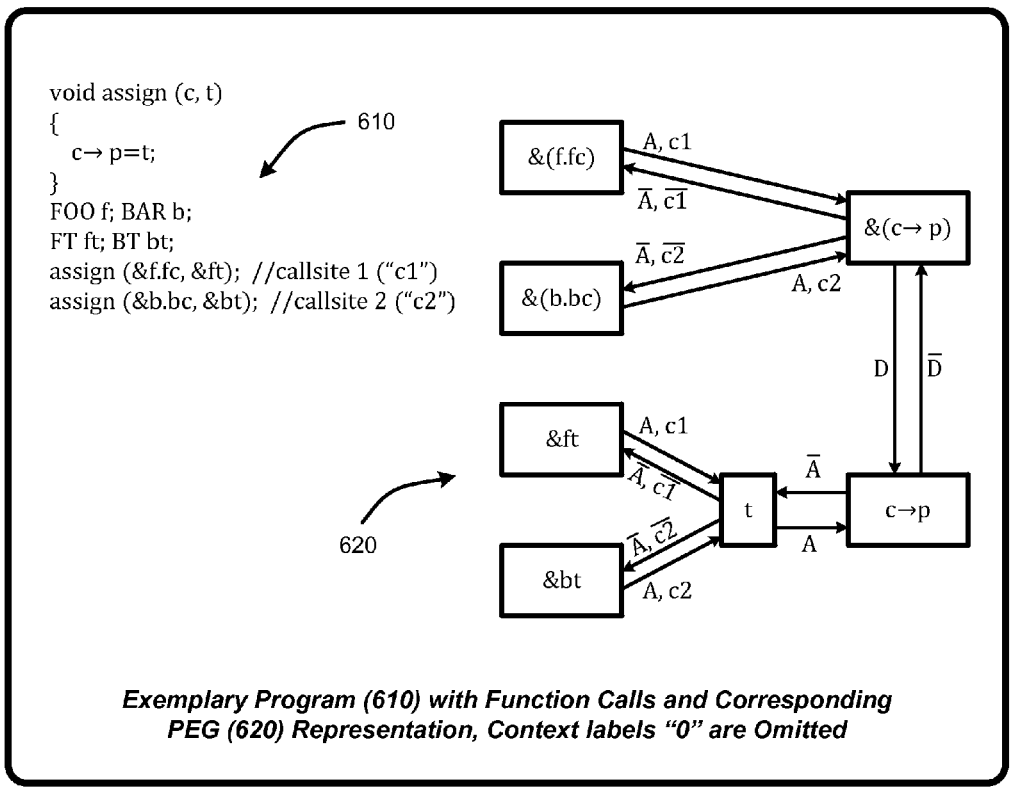
FIG. 6 provides an example of a simple exemplary C-type program and corresponding program expression graph (PEG) with calling context information embedded, as described herein.

2.4 Context Sensitivity:

Like field-sensitivity, context-sensitivity is used for precisely identifying candidate types for selected pointers. To support context-sensitivity, in various embodiments, the PEG is further modified to add a context label, "c" to existing edges. This context, c, can be $c_k$, $\overline{c_k}$ or $\phi$ (i.e., no calling context), where k represents the k-th call site. $\phi$ is added to dereference edges and field edges as well as assignment edges that do not involve function calls. Given a call site $c_k$:v=func (act$_1$, act$_2$, . . . ), and the function func(par$_1$,par$_2$, . . . ){ . . . ; returnr;}, $c_k$ is added to the assignment edges from act$_j$ to par$_j$ and from v to r, and $\overline{c_k}$ to the edges in the opposite direction. Note that FIG. 6 shows a sample program with function calls and the relevant PEG representation.

Figure 7:
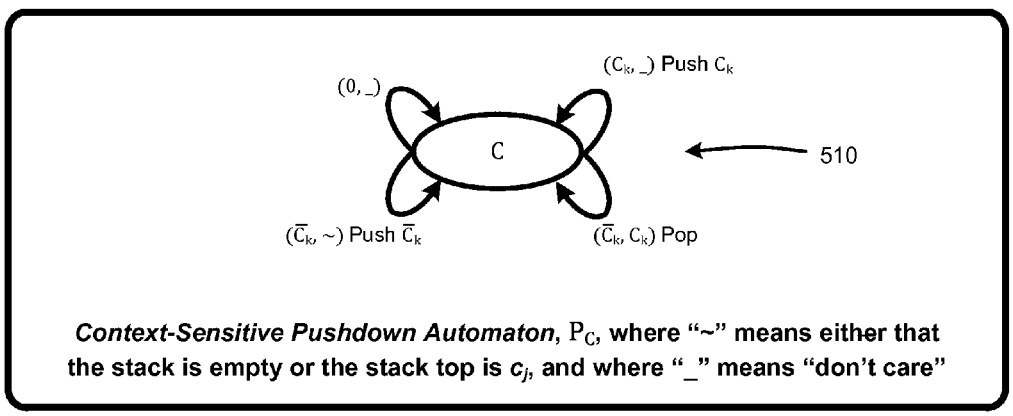
FIG. 7 provides an exemplary "context-sensitive pushdown automaton" for a modified PEG having context labels on existing edges, as described herein.

Next, a context-sensitive pushdown automaton, $P_C$, is constructed to deal with context-sensitivity as shown in FIG. 7. The context-sensitive pushdown automaton, $P_C$, has two states C and Dead (termination) and a stack that stores context labels. It consumes $\phi$ labels freely without changing anything, and pushes $c_k$ upon consuming a $c_k$ label. Upon consuming a $\overline{c_k}$ label, it scans the top of the stack to perform the following:

(1) Push $\overline{c_k}$ if the stack is either empty or the stack top is $\overline{c_j}$;

(2) Pop the stack if the stack top is $c_k$ (i.e., a call and a return at the same call site are matched); and (3) Terminate and reject the sequence otherwise.

Given the automatons $P_V$, $P_F$, and $P_C$, a path in the PEG is acceptable if its sequence of label pairs are acceptable by all three automatons (i.e., the "word" formed by sequence of edge labels is valid based on all three grammars $G_V$, $G_F$, and $G_C$). An exemplary worklist algorithm, with functions and the main algorithm shown below, illustrates one of many ways in which the above-described formulation can be implemented to search for the value alias set of a given expression p.

In particular, the functions for this exemplary algorithm include Vtransit, Ftransit, and Ctransit, representing pushdown automaton $P_V$, and optional pushdown automatons $P_F$ and $P_C$, respectively, as follows:

Function Vtransit(o,s,i):

Input: (o,s)//the old state (o) and old stack (s) of pushdpown automaton $P_V$ (represented in this algorithm using "V"), i the newly consumed information label;

Output: (n, s')//the new state (n) (including dead) and new stack (s') according to the transition rules of Automaton V (i.e., $P_V$);

Function Ftransit(o,s,i):

Input: (o,s)//the old counter (o) and old stack (s) of pushdpown automaton $P_F$ (represented in this algorithm as Automaton "F"), i the newly consumed information label;

Output: (n,s')//the new counter (n) (with a special value dead) and new stack (s') according to the transition rules of Automaton F (i.e., $P_F$)

Function Ctransit(s,c):

Input: s//the old stack (s) of pushdpown automaton $P_C$ (represented in this algorithm as Automaton "C"), c the newly consumed context label Output: (n,s')//the new state (n) (dead or C) and the new stack (s') according to the transition rules of Automaton C (i.e., $P_C$);

The main algorithm using the above-defined functions is illustrated below:

---

Main Algorithm:

Input:   PEG constructed from program source code or binary modules, interesting (or user-selected) expression p
Output:  {(q, cs)} // p, q are value aliases, as described above, and cs is the call path from q to p
         r: = { } // alias set
         w: = {(p, Left, $\phi$, 0, $\phi$, $\phi$)}
         while w ≠ { } do
             remove (x, Vo, Vs, Fo, Fs, Cs)from w;
             if Vs = $\phi \wedge$ Fs = $\phi$ then
                 r: = r + (x, Cs) // update the alias set
             end if
             for edge ← all edges originating from x do
                 y: = edge.toNode; (i, c): = edge.label
                 (Vn, Vs'): = Vtransit(Vo, Vs, i)
                 (Fn, Fs') = Ftransit(Fo, Fs, i)
                 (Cn, Cs') = Ctransit(Cs, c)
                 if Vn ≠ dead $\wedge$ Fn ≠ dead $\wedge$ Cn ≠ dead then
                     w: = w + (y, Vn, Vs', Fn, Fs', Cs')
                 end if
             end for
         end while
return r

---

3.0 Implementation and Use Considerations for the DDPA:

The following paragraphs describe various uses of the demand-driven pointer analysis processes provided by the DDPA to derive the set of type-related information used in dynamic data type identification.

3.1 Candidate Types of Selected Pointers:

In general, given a binary module to be evaluated by the DDPA, the set of type-related information has three parts: (1) the candidate types for selected pointers, (2) the candidate types for pool tags, and (3) the summaries of exported functions. For example, a "generic pointer" is a pointer whose type definition does not reveal the actual type of the data it refers to. In general, two kinds of generic pointers are considered: void* and pointers in linked list constructs. Linked list constructs are considered because the declared type of its pointer fields does not reflect the larger data structure that contains the list entry.

For an expression p of type void*, its candidate types are the set of types of its value aliases. For instance, given FOO*q; void*p; p=q, the DDPA will return p's candidate type as FOO*. Give two void* expressions a→$f_i$ and b→$f_i$ that refer to the same field in two different instances, the DDPA will derive the candidate types for the pointer field. Thus, a void* pointer field $f_i$'s candidate types are defined as the set of types of all the values aliases of expressions of the form X→$f_i$ where X is an arbitrary expression.

To deal with pointer fields in linked list constructs, the DDPA solves two problems. The first problem is related to with whether the larger data structure of a list entry is nested. In this case, the types of the value aliases are not used directly since they are about the linked list itself. Instead, when a linked list pointer field's value alias is in the form of $\&(a \rightarrow f_i)$, then its "nested candidate type" is $\&(A \rightarrow f_i)$ where a's type is A*. This nested candidate type allows the DDPA to identify the larger data structure A when the linked list pointer points to its field $f_i$. However, for purposes of explanation, candidate types will still be used to discuss linked list constructs below.

Second, there is usually a difference between a "head node" and an "entry node" since they may be nested in different data structures. Since the value alias set of a linked list pointer field has both the head node and the entry node, the DDPA cannot compute its candidate types directly from its value alias set. To solve this problem, the DDPA leverages the semantics of APIs for linked list constructs. For instance, InsertTailList is a known function in the Windows® Driver Kit for inserting an entry at the tail of a doubly linked list. InsertTailList takes two parameters, ListHead and Entry. To differentiate the list head and entry, the value alias sets of ListHead/InsertTailList and Entry/InsertTailList are computed, where a/func represents the parameter a of a function func. The value aliases from each set are then matched with respect to context sensitivity (see Section 2.4, above). For each valid pair of $\&(a \rightarrow f_i)$ and $\&(b \rightarrow f_j)$, a list head at $\&(A \rightarrow f_i)$ has a nested candidate type of $\&(B \rightarrow f_j)$ where a's type is A* and b's type is B*. Note that this approach uses prior knowledge of all linked list constructs and their APIs. However, given the limited number of such cases, it is not difficult to adapt the processes for implementing the DDPA to large programs like the Windows® kernel and drivers.

3.1.1 Refinement Techniques:

To control the number of candidate types, three optional refinement techniques are applied to the basic processes described above in Section 3.1.

First, given a linked list pointer p, the DDPA only considers its value aliases with the same type as p when looking for candidate types. This allows the DDPA to easily exclude some noise caused by conservative pointer analysis. Second, for each pointer path from p to its value alias q, the DDPA checks if it involves a type cast to void*. If so, that path will be ignored. This is done for two reasons: (1) the type before the cast has already revealed the candidate type; (2) noisy aliases following the type cast are avoided. If all the pointers to a value alias are ignored, the value alias is ignored as well. Third, the DDPA checks whether a nested candidate type is a nested type of another candidate type. If so, the nested type is removed. After removing all nested types, if there is still more than one candidate type, the DDPA looks for the largest common nested type among all the remaining candidate types and uses it as the single candidate type.

3.2 Candidate Types of Pool Taqs:

As is well known to those skilled in the art, in recent Windows® operating systems, "pool tags" are used to track memory allocations of one or more particular data types by a kernel component. A "pool tag" is defined as a four-character literal passed to the pool manager at a memory allocation or deallocation. One such well known API is "ExAllocatePoolWithTag." For many pool tags, a memory block with a particular pool tag is allocated for a unique data type. For instance, "Irp" is used for the data type IRP. The DDPA can be used with a static analysis to automatically unearth the associations between pool tags and data types to be used in a memory traversal. The types associated with a pool tag are referred to herein as the candidate types for the pool tag.

The approach for handling pool tags is similar to the approach discussed above for linked list constructs. In particular, taking ExAllocatePoolWithTag as an example, the value alias sets for return/ExAllocatePoolWithTag and Tag/ExAllocatePoolWithTag are first computed, where the former represents the return value of ExAllocatePoolWithTag and the latter is the pool tag parameter. Since pool tags are usually specified directly at function calls for memory allocations, the DDPA performs a simple memory traversal by following assignments on the program expression graph (PEG) to compute the "value alias" set of Tag/ExAllocatePoolWithTag. The value aliases in each set are then matched based on context sensitivity (as discussed above in Section 2.4)

For instance, given the following code:
FOO*f=(FOO*) ExAllocatePoolWithTag(NonPagedPool, sizeof (FOO), 'DooF')
the DDPA analysis will infer that the pool tag "DooF" is associated with the type FOO. This analysis is performed for all memory allocation functions that require pool tags. Additionally, lookaside lists are handled by first associating pool tags with lookaside lists and then associating the lookaside lists with data types.

3.3 Inter-Module Analysis:

In contrast to conventional techniques that analyze all program modules together, when using the DDPA, each module can be analyzed separately. This is useful for handling real-world memory snapshots since they may have different program modules loaded.

One challenge of this approach is the import/export functions commonly used in all kernel components. For instance, assume that the assign function illustrated in FIG. 6 is implemented in a different module and being exported. If the information flow in imported functions is not tracked, the candidate type for pointer fields in FOO will be missed. Therefore, to address this issue summaries of exported functions of one module are first computed, these summaries are then considered when performing pointer analysis on another module that imports functions from the first module.

Specifically, for each pointer parameter and return in an exported function, its value alias set inside its own module is computed. Then, every pointer path from the parameter to another parameter in the same exported function is saved as a part of the summary for this function. All the valid pointer paths from one parameter to another in an exported function form the summary of the function. To accommodate the special handling of linked list constructs, all the pointer paths from the list head and entry parameters to parameters in exported functions are also summarized.

Before performing pointer analysis on a module that has imports, the summaries of all its imports are first read. For each pointer path in the summary, a virtual edge is constructed between the two parameters it connects. When such a virtual edge is visited in the pointer analysis (see Section 2), all the labels in the original pointer path is applied to the automaton (i.e., $P_V$, $P_F$, and/or $P_C$) to decide if this edge is acceptable.

Note that there is one difference between the pointer paths used for summarizing exported functions and the pointer paths accepted by the automata discussed above. In particular, for the pointer paths in function summaries, the automata $P_V$ and $P_F$ are revised to accept paths that have multiple D and $f_i$ labels at the bottom of the stacks. This is because, when this pointer path is treated as a virtual edge in pointer analysis, these D and $f_i$ labels can be canceled off with the $\overline{D}$ and $\overline{f}_i$ labels in the stacks when the virtual edge is visited.

3.4 Dynamic Data Type Identification:

The following paragraphs provide a discussion of how dynamic data is located in a given memory snapshot and their types identified. The inputs of the dynamic data type identification component are a memory snapshot, the type-related information derived from the static analysis and the symbol information (e.g., a .pdb file) for each loaded module for which it is available. The output is a list of memory locations and types, representing the dynamic data objects that have been identified. Note that as is well known to those skilled in the art, a program database (.pdb) file holds debugging and project state information that allows incremental linking of a debug configuration of the program module or source code being evaluated.

To type dynamic data, the static objects in each loaded module are first located. The pointers in these objects are then recursively followed in all newly identified data objects until no new data object is added. Note that this basic idea has been applied in conventional analysis techniques. However, the following paragraphs describe changes to those techniques that have been used in implementing the DDPA described herein.

For example, in contrast to conventional techniques that attempt to resolve type ambiguities, the DDPA ignores pointers in unions and pointers that have more than one candidate type. This allows the DDPA to avoid the heuristics used in other techniques that have caused deficiencies in the robustness and performance of the pointer analysis provided by such techniques.

Further, in contrast to conventional processes, the associations between pool tags and data types are leveraged in memory traversals. Note that such associations are automatically in the static analysis. Specifically, the pool tag and data type associations are used in the following two ways:

1) The pool tag information is used to identify objects directly. In particular, for a memory block whose pool tag has a single candidate type, a check is made to determine if the memory block's size matches the size of the data type. If so, it is inferred that a data object of the candidate type in the memory block under the condition that constraint checking is passed. When the sizes are matched, compensation for patching is made to ensure that a memory block falls onto the 8-byte or 16-byte boundary.
2) The pool tag information is used as a constraint on data object candidates. In particular, the type of each data object is in the set of possible types of the pool block in which the data object is located.

Before adding a new data object in the memory traversal, a check is made to determine if it is valid by checking several constraints. This is done because a pointer may be invalid for various reasons (e.g., it is not initialized) and thus the object it points to may be invalid as well. Checks are made for four kinds of constraints, as defined below:

1) Size Constraint: a data object must fall into the boundary of a memory block. Note that the information of all allocated memory blocks is collected before the memory traversal.
2) Pointer Constraint: a data object's pointer fields are either null or point to the kernel address range.
3) Enum Constraint: a data object's enum fields use a valid enum value which is stored in the program modules .pdb files.
4) Pool Block Type constraint: as noted above, the type of each data object is in the set of possible types of the pool block in which the data object is located.

Figure 8:
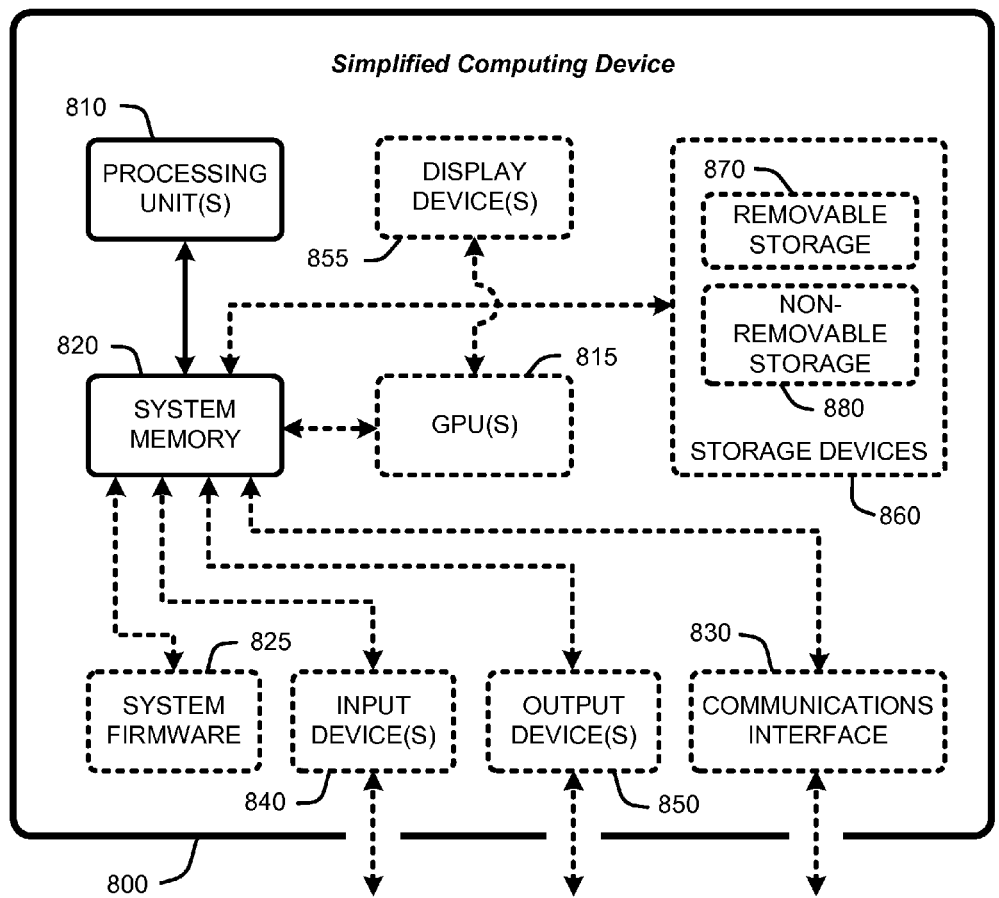
FIG. 8 is a general system diagram depicting a simplified general-purpose computing device having simplified computing and I/O capabilities for use in implementing various embodiments of the Demand-Driven Pointer Analyzer.

4.0 Exemplary Operating Environments:

The DDPA described herein is operational within numerous types of general purpose or special purpose computing system environments or configurations. FIG. 8 illustrates a simplified example of a general-purpose computer system on which various embodiments and elements of the DDPA, as described herein, may be implemented. It should be noted that any boxes that are represented by broken or dashed lines in FIG. 8 represent alternate embodiments of the simplified computing device, and that any or all of these alternate embodiments, as described below, may be used in combination with other alternate embodiments that are described throughout this document.

For example, FIG. 8 shows a general system diagram showing a simplified computing device 800. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the DDPA, the device should have a sufficient computational capability and system memory to enable basic computational operations. In particular, as illustrated by FIG. 8, the computational capability is generally illustrated by one or more processing unit(s) 810, and may also include one or more GPUs 815, either or both in communication with system memory 820. Note that that the processing unit(s) 810 of the general computing device of may be specialized microprocessors, such as a DSP, a VLIW, or other micro-controller, or can be conventional CPUs having one or more processing cores, including specialized GPU-based cores in a multi-core CPU. The simplified computing device 800 may also include optional system firmware 825.

In addition, the simplified computing device of FIG. 8 may also include other components, such as, for example, a communications interface 830. The simplified computing device of FIG. 8 may also include one or more conventional computer input devices 840 (e.g., pointing devices, keyboards, audio input devices, video input devices, haptic input devices, devices for receiving wired or wireless data transmissions, etc.). The simplified computing device of FIG. 8 may also include other optional components, such as, for example, one or more conventional computer output devices 850 (e.g., display device(s) 855, audio output devices, video output devices, devices for transmitting wired or wireless data transmissions, etc.). Note that typical communications interfaces 830, input devices 840, output devices 850, and storage devices 860 for general-purpose computers are well known to those skilled in the art, and will not be described in detail herein.

The simplified computing device of FIG. 8 may also include a variety of computer readable media. Computer readable media can be any available media that can be accessed by computer 800 via storage devices 860 and includes both volatile and nonvolatile media that is either removable 870 or non-removable 880, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the DDPA described herein, or portions thereof, may be stored, received, transmitted, or read from any desired combination of computer or machine readable media or storage devices and communication media in the form of computer executable instructions or other data structures.

Finally, the DDPA described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the DDPA has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the DDPA. It is intended that the scope of the invention be limited not by this detailed description, but rather by the claims appended hereto.

What is claimed is:

1. A computer-implemented method for identifying alias sets for selected pointers, comprising steps for:
   receiving a computer program;
   constructing a program expression graph (PEG) from the computer program, such that each program expression is represented by a "node" in the PEG and edges between nodes are either an "assignment edge" or a "dereference edge";
   modeling a "value alias" relation between nodes with a first context-free grammar such that two program expressions are value aliases if and only if there exists such a path between them on the PEG that the sequence of labels along the path belongs to a first context-free language generated by the first context-free grammar;
   constructing a first pushdown automaton for the first context-free grammar such that the first pushdown automaton accepts a sequence of labels if and only if it belongs to the first context-free language generated by the first context-free grammar
   constructing a modified PEG by evaluating the computer program to add new edges between nodes for corresponding field relations with corresponding structure assignments based on the computer program;
   modeling field-sensitive value alias relations with a second context-free grammar such that two expressions are field-sensitive value aliases if and only if there exists such a path between them on the PEG that the sequence of labels along the path belongs to both the first context-free language and a second context-free language generated by the second context-free grammar;
   constructing a second pushdown automaton for the second context-free grammar such that the second pushdown automaton accepts a sequence of labels if and only if it belongs to the second context-free language for a selected expression of the computer program; and
   recursively traversing the PEG and evaluating the generated sequence of labels with the first and second pushdown automata, and adding a particular node into a value alias set of the selective expression if the corresponding sequence of labels are accepted by both the first and second pushdown automata.

2. The method of claim 1 further comprising steps for further modifying the modified PEG to produce a third PEG by evaluating the computer program to add corresponding context information to one or more existing edges of the PEG.

3. The method of claim 2 further comprising modeling the context information with a third context-free grammar such that two expressions are context-sensitive value aliases if and only if there exists such a path between them on the PEG that the sequence of labels along the path belongs to a third context-free language generated by the third context-free grammar.

4. The method of claim 3 further comprising constructing a third pushdown automaton for the third context-free grammar such that the third pushdown automaton accepts a sequence of labels if and only if it belongs to the third context-free language for a selected expression of the computer program.

5. The method of claim 4 further comprising verifying whether the corresponding sequence of labels for any particular node is also accepted by the third pushdown automaton before any corresponding expression is added to the alias set for the selected expression.

6. The method of claim 1 wherein the selected expression is selected by a user via a user interface.

7. The method of claim 1 wherein the selected expression is selected by an automated process.

8. The method of claim 1 further comprising a device for performing a debug analysis of the computer program using one or more of the alias sets.

9. A system for identifying alias sets for selected pointers in a computer program, comprising:
   a processor;
   a device for receiving a computer program;
   a device for constructing a program expression graph (PEG) from the computer program, such that each program expression is represented by a "node" in the PEG and edges between nodes are either an "assignment edge" or a "dereference edge";

a device for modeling a "value alias" relation between nodes with a first context-free grammar such that two program expressions are value aliases if and only if there exists such a path between them on the PEG that the sequence of labels along the path belongs to a first context-free language generated by the first context-free grammar;

a device for constructing a first pushdown automaton for the first context-free grammar such that the first pushdown automaton accepts a sequence of labels if and only if it belongs to the first context-free language generated by the first context-free grammar a device for constructing a modified PEG by evaluating the computer program to add new edges between nodes for corresponding field relations with corresponding structure assignments based on the computer program;

a device for modeling field-sensitive value alias relations with a second context-free grammar such that two expressions are field-sensitive value aliases if and only if there exists such a path between them on the PEG that the sequence of labels along the path belongs to both the first context-free language and a second context-free language generated by the second context-free grammar;

a device for constructing a second pushdown automaton for the second context-free grammar such that the second pushdown automaton accepts a sequence of labels if and only if it belongs to the second context-free language for a selected expression of the computer program; and a device for recursively traversing the PEG and evaluating the generated sequence of labels with the first and second pushdown automata, and adding a particular node into a value alias set of the selective expression if the corresponding sequence of labels are accepted by both the first and second pushdown automata.

10. The system of claim 9 further comprising a device for further modifying the modified PEG to produce a third PEG by evaluating the computer program to add corresponding context information to one or more existing edges of the PEG.

11. The system of claim 10 further comprising modeling the context information with a third context-free grammar such that two expressions are context-sensitive value aliases if and only if there exists such a path between them on the PEG that the sequence of labels along the path belongs to a third context-free language generated by the third context-free grammar.

12. The system of claim 11 further comprising constructing a third pushdown automaton for the third context-free grammar such that the third pushdown automaton accepts a sequence of labels if and only if it belongs to the third context-free language for a selected expression of the computer program.

13. The system of claim 12 further comprising verifying whether the corresponding sequence of labels for any particular node is also accepted by the third pushdown automaton before any corresponding expression is added to the alias set for the selected expression.

14. The system of claim 9 wherein the selected expression is selected by a user via a user interface.

15. The system of claim 9 further comprising a device for performing a debug analysis of the computer program using one or more of the alias sets.

16. A hardware storage device having computer executable instructions stored therein for generating alias sets for selected pointers in a computer program, said instructions causing a computing device to perform actions comprising:

receiving a computer program;

constructing a program expression graph (PEG) from the computer program, such that each program expression is represented by a "node" in the PEG and edges between nodes are either an "assignment edge" or a "dereference edge";

modeling a "value alias" relation between nodes with a first context-free grammar such that two program expressions are value aliases if and only if there exists such a path between them on the PEG that the sequence of labels along the path belongs to a first context-free language generated by the first context-free grammar;

constructing a first pushdown automaton for the first context-free grammar such that the first pushdown automaton accepts a sequence of labels if and only if it belongs to the first context-free language generated by the first context-free grammar constructing a modified PEG by evaluating the computer program to add new edges between nodes for corresponding field relations with corresponding structure assignments based on the computer program;

modeling field-sensitive value alias relations with a second context-free grammar such that two expressions are field-sensitive value aliases if and only if there exists such a path between them on the PEG that the sequence of labels along the path belongs to both the first context-free language and a second context-free language generated by the second context-free grammar;

constructing a second pushdown automaton for the second context-free grammar such that the second pushdown automaton accepts a sequence of labels if and only if it belongs to the second context-free language for a selected expression of the computer program; and recursively traversing the PEG and evaluating the generated sequence of labels with the first and second pushdown automata, and adding a particular node into a value alias set of the selective expression if the corresponding sequence of labels are accepted by both the first and second pushdown automata.

17. The hardware storage device of claim 16 further comprising further modifying the modified PEG to produce a third PEG by evaluating the computer program to add corresponding context information to one or more existing edges of the PEG, and modeling the context information with a third context-free grammar such that two expressions are context-sensitive value aliases if and only if there exists such a path between them on the PEG that the sequence of labels along the path belongs to a third context-free language generated by the third context-free grammar.

18. The hardware storage device of claim 17 further comprising constructing a third pushdown automaton for the third context-free grammar such that the third pushdown automaton accepts a sequence of labels if and only if it belongs to the third context-free language for a selected expression of the computer program, and verifying whether the corresponding sequence of labels for any particular node is also accepted by the third pushdown automaton before any corresponding expression is added to the alias set for the selected expression.

19. The hardware storage device of claim 16 wherein the selected expression is selected by a user via a user interface.

20. The hardware storage device of claim 16 further comprising instructions for performing a debug analysis of the computer program using one or more of the alias sets.

* * * * *